April 7, 1970  M. M. SEELOFF  3,504,427
METHOD OF JOINING METAL SHEET AND STRIP

Filed Dec. 4, 1967  3 Sheets-Sheet 2

INVENTOR.
MELVIN M. SEELOFF
BY
*William J. Ruano*
ATTORNEY

April 7, 1970   M. M. SEELOFF   3,504,427
METHOD OF JOINING METAL SHEET AND STRIP Filed Dec. 4, 1967   3 Sheets-Sheet 3

INVENTOR
MELVIN M. SEELOFF
BY
ATTORNEY

United States Patent Office 3,504,427
Patented Apr. 7, 1970

3,504,427
METHOD OF JOINING METAL SHEET AND STRIP
Melvin M. Seeloff, Warren, Ohio, assignor to The Taylor-Winfield Corporation, Warren, Ohio
Continuation-in-part of application Ser. No. 625,098, Mar. 22, 1967. This application Dec. 4, 1967, Ser. No. 687,887
Int. Cl. B23k *31/02*
U.S. Cl. 29—482                                22 Claims

ABSTRACT OF THE DISCLOSURE

Improvement over my earlier Patent No. 3,313,911 comprising simultaneously beveling opposite surfaces of each end portion of metal strips or sheets while the ends are separated by either a small or large gap. The beveled end portions are then slightly overlapped and retracted sufficiently to provide triangular voids. These end portions are planished under substantial pressure, while hot or cold, so that the excess metal fills the voids and so that the overlapped welded joint is reduced to the thickness of the parent metal. Cleaning and vibrating apparatus are used preliminarily to remove oxide or other coating and to facilitate pre-planishing.

---

This invention relates generally to the electric resistance welding art and, more particularly, to an improved method for joining metal sheet and strip in general edge-to-edge or end-to-end relation whereby a continuation of the principal surfaces of either workpiece may be effected. This invention is a continuation-in-part of my copending application Ser. No. 625,098, filed Mar. 22, 1967, which, in turn, is a continuation-in-part of my application Ser. No. 373,779, filed June 9, 1964 (now Patent No. 3,313,911).

In the heavier gauges, flash-butt welds are commonly effected followed by the machining or scarfing off of the excess upset and flash metal to provide a joint which is flat and smooth and of the thickness of the parent strip. In the lighter gauges, it is common practice to lap weld the adjacent end portions of the workpieces together, with the overlap being of the order of 1/16 inch to allow for substantial mashing down of the weld by the action of the welding electrodes and the following planishing rolls or peening hammers, if used, whereby the resultant welded overlapped joint may approach in thickness the initial thickness of the sheet or strip workpieces.

The above-mentioned joint thickness control is ordinarily important either in the final product or in subsequent processing, and heretofore various attempts have been made to effect narrow overlapped joints of good consistent quality and having a combined thickness substantially equal to the thickness of the parent metal. In actual practice, however, it has heretofore not been possible to achieve both results since if the attempt is made to effect the required thickness reduction either by the application of excess pressure to the welding electrodes or by the application of adequate force through planishing rolls or peening hammers, the subsequent product is wavy and distorted. The problem is one of displacing the excess metal caused by the overlap and in the case of wide strip or welds of appreciable length it is not possible to provide space for the flow of this excess metal by the elongation of the strip or separation of the workpieces because of the very great strength of the welded strips or sheet in their own planes. When dealing with very narrow strip stock or short welds it is possible to progressively displace the excess metal ahead of the welding wheel or ahead of a planishing roll but this ordinarily requires edge trimming as will be understood.

Accordingly, in my aforesaid Patent No. 3,313,911, I described an invention to provide an improved strip or sheet joining procedure wherein the joining was effected by the rapid and simple overlapped seam welding method but wherein provision was made for accommodating the excess metal caused by the overlap uniformly throughout the width of the strip or along the length of the weld to enable the thickness of the weld to be readily reduced precisely down to the thickness of the parent sheet or strip.

More specifically, the aforesaid patent covered a method of joining metal sheet or strip workpieces comprising the steps of first narrowly overlapping adjacent edge portions of the workpieces to be joined together, applying a sufficient compressive force to the overlap to cause the interengaging edges thereof to be mashed down to establish on each workpiece a welding face angularly but flatly related to the plane of the workpiece, thereafter backing off said workpieces slightly away from each other to expose narrow widths of said faces, welding the remaining interengaging portions of said faces together by an electric resistance process, and finally compressing the overlapped workpieces along the line of weld sufficiently to displace metal thereof onto said exposed narrow portions of said faces to reduce the overall thickness of the weld to substantially the initial thickness of the workpieces.

In the aforesaid method, the compressive force is applied by using either swaging or peening hammers or swaging rolls. The swaging hammers do their work by short rapid reciprocating strokes, imparting an impact to the sheet edges being prepared. Besides distorting the metal as required, the impact of the short rapid strokes has a tendency to loosen and expel any coating or oxide formed or deposited on the parent metal, thus facilitating the welding of the material. The short stroke hammers, although they do an excellent job, have the disadvantage of leaving the finished surface quite rough as well as requiring greater maintenance. Moreover, commercially available hammers have limitations in size for displacing metal on heavy thicknesses.

The swaging rolls do their work by exerting a maintained force on the sheet edges, said edges being squeezed between a pair of the swaging rolls to accomplish the lap preparation, prior to, and after the welding operation.

The rolling action of the swaging rolls is very effective in preparing the sheet edges as described in the above-mentioned applications. They also give a very fine appearance to the final weld joint. The rolls are also a very low maintenance item and can be designed to have any choice of forces.

However, as will be noted in FIG. 2 which illustrates the method covered by my Patent No. 3,313,911, of slightly overlapping the ends of the strips or sheets before planishing, it will be noted that since the lower clamp faces are in the same plane, the ends of the strips or sheets 13, and 14 will be turned slightly upwardly and downwardly, respectively, so as to present pointed edges against the faces of planishing wheels 16, which pointed edges will become flattened at 19 as the result of planishing, as shown in FIG. 3. The flattening of such edges loosens any oxide or coatings in this area of the parent sheet, therefore in view of the heavy pressure of such preplanishing and resulting beveling operations, the oxides or coatings have a tendency to become trapped between the inner faces.

This presents serious disadvantages, particularly for steel surfaces covered with iron oxide, magnesium oxide, etc., and galvanized or tinned strips or those covered with other types of coating, all of which are detrimental in various degrees, to making a high quality welded joint.

Most of these oxides or coatings, unless removed, will be picked up by the weld wheel surfaces and cause severe deterioration of such surfaces which causes holes and imperfections to be burned in the weld joint. These disadvantages occur even if vibratory planishing force is applied as described in my earlier application Ser. No. 625,098.

Therefore, as mentioned previously, any oxide or deposited coatings will have a tendency to be squeezed into the metal or lie loosely on or in between the metal strips, thus impairing the weld condition.

An object of the present invention is to overcome the abovementioned disadvantages while still retaining all the advantages of the methods previously described in my aforesaid earlier patent applications.

A more specific object of the invention is to bevel opposite surfaces of both end portions of the metal strips or sheets to be welded, but while the end portions are separated, that is, before being overlapped, so as to avoid entrapment of oxide coatings and the like in the welded interface.

Another object of the invention is to provide sonic or supersonic vibrations to the beveling preplanishing wheels as well as the final planishing wheels to facilitate planishing.

A further object of the invention is to provide wire brushes, sanding wheels or the like for the removal of oxides loosened by the bevelled planishing rolls.

A more specific object of the invention is to taper the end portions of strips or sheets while apart or separated and cleaning said ends by vibration, and/or brushing, and thereafter overlapping the clean tapered end portions, withdrawing the ends sufficiently to provide grooves for receiving excess metal from a planishing operation, and finally planishing or hammering said overlapped end portions until the weld joint assumes the thickness of the parent sheet or strip.

Other objects and advantages will become more apparent from a study of the following description taken with the accompanying drawings wherein.

Figure 1:
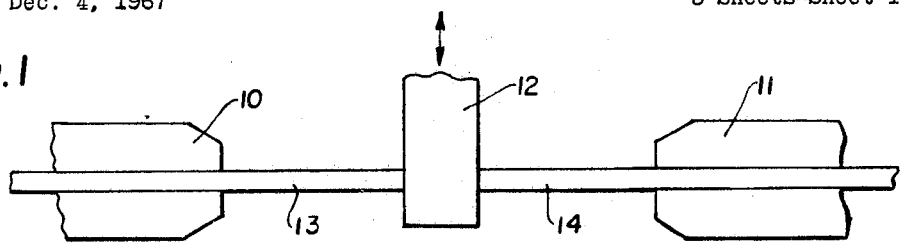
FIGS. 1, 2 and 3 are schematic representations of sequential operations on overlapped sheets or strips as set forth in my aforesaid Patent No. 3,313,911.
Figure 2:
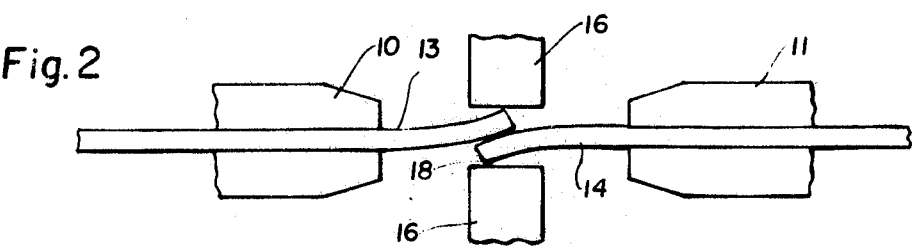
Figure 3:
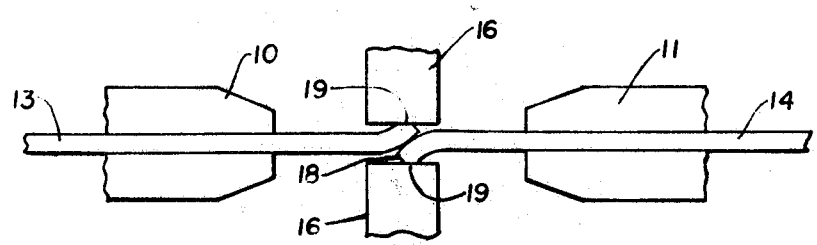
Figure 4:
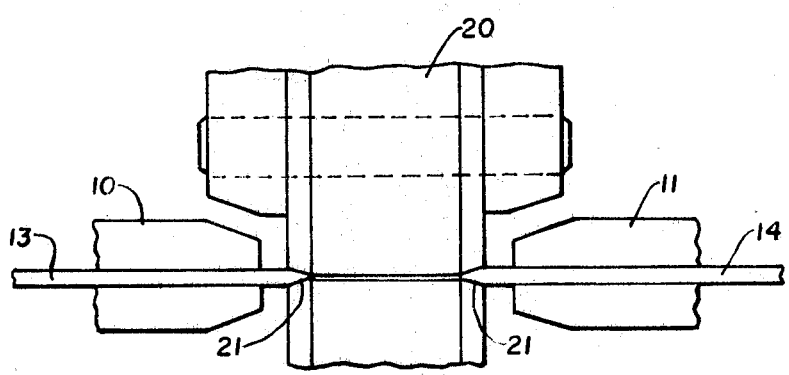
FIG. 4 is a schematic showing of how the ends of the sheets or strips are tapered while substantially separated, such as in the shear position of the welder, in accordance with the present invention.
Figure 5:
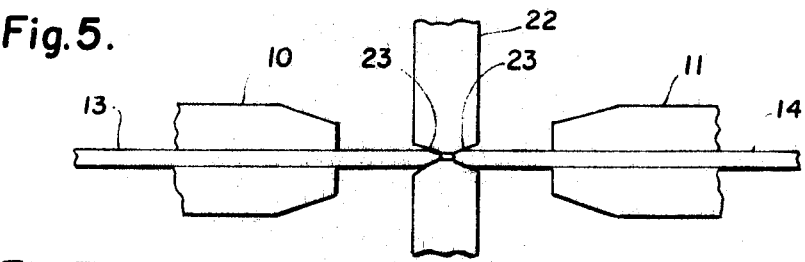
FIG. 5 is a modification of FIG. 4 and a preferred embodiment of the invention showing the tapering of the end portions of strips or sheets while separated by a small gap.

The method of the invention may be best understood by reference to FIGS. 4 and 5 of the drawings. FIG. 4 shows the strips 13, 14 in a substantially separated position, such as occurs in the shear position of the welder. The preplanishing wheels 20 are beveled along both outer edges so as to form at 21 correspondingly beveled end portions of clamped strips 13 and 14.

A preferred method of beveling both surfaces of both end portions of the strips simultaneously is illustrated in FIG. 5 wherein the ends of the strips 13, 14 are separated only sufficiently to allow room for displacing metal as the result of preplanishing. More specifically, preplanishing wheels 22 are provided, each having beveled edges which effect at 23 a corresponding bevel on both surfaces of each end portion of the strips simultaneously, as shown. Such preplanishing loosens the oxide or other coating on the strips.

Figure 11:
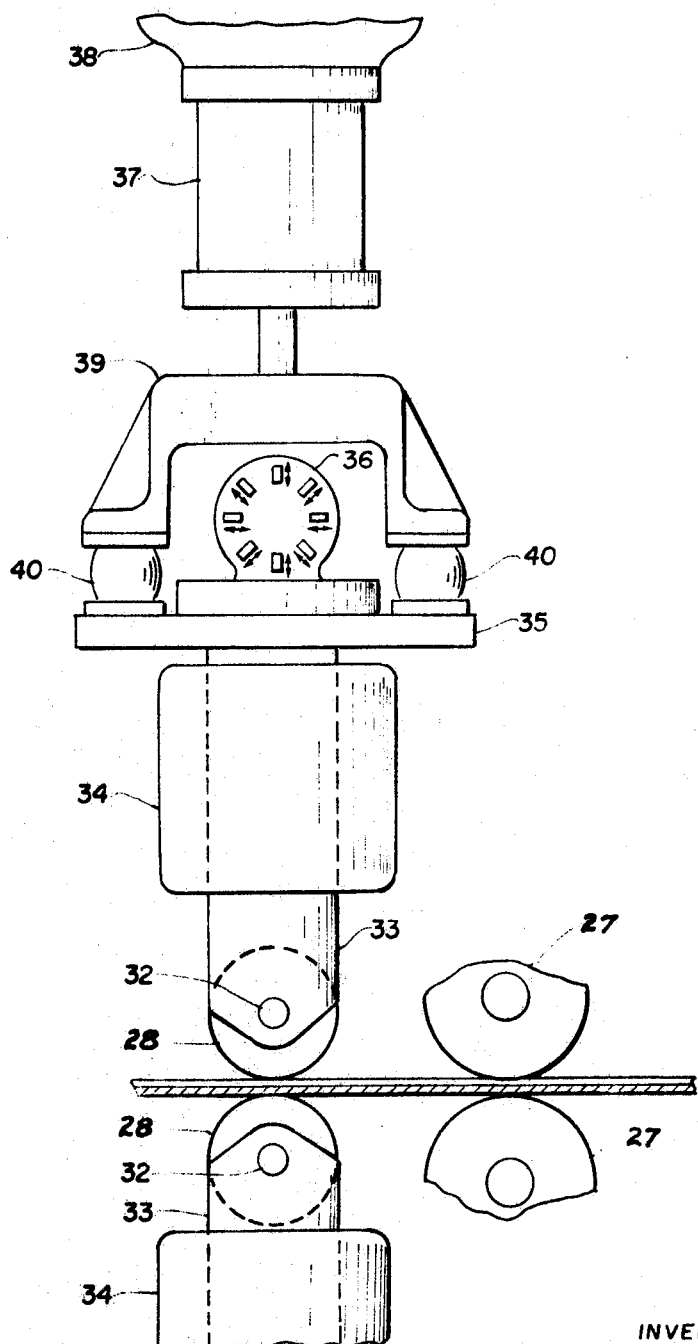
FIG. 11 shows a vibrator applied to the planishing rolls.

This loosening action of the coating may be accelerated by vibrating the beveled planishing wheels 22 by a vibrator as shown in FIG. 11 of the drawing, which will be described later.

Figure 6:
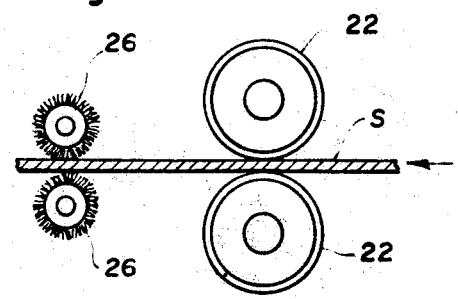
FIG. 6 is a schematic showing of wire brushes or sanding wheels removing oxides loosened by the bevelled planishing rolls of FIG. 4 or FIG. 5.

FIG. 6 shows wire brushes and/or sanding wheels 26 for sanding and/or brushing off the tapered end portions to insure that they are clean. Of course, if the sheets are initially free of oxides or a coating, the sanding wheels and brushes will not be required. The beveling or planishing wheel 22, in some instances, may be vibrated as wheels 28 are vibrated in FIG. 11 whether or not the sheets or strips are coated, to facilitate the preplanishing or beveling operation. The surfaces of planishing wheels 22 may be roughened, serrated or knurled to help loosen the oxides or coatings (see FIG. 9).

Such planishing operation (FIG. 5) may also be facilitated by preheating the end portions of the sheets or strips before the beveling operation. This may be done in many ways, such as by applying a torch on the end portions.

Figure 8:
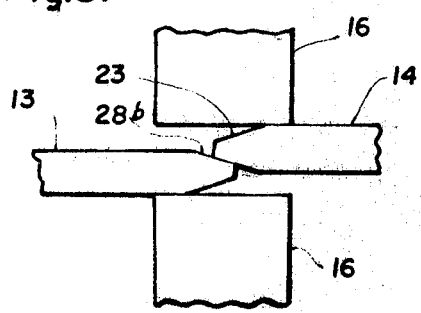
FIG. 8 shows how the beveled end portions of the sheets or strips are overlapped before final planishing and welding.
Figure 10:
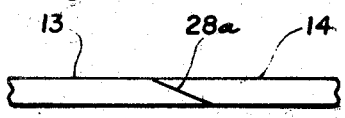
FIG. 10 shows the welded strips or sheets after the final planishing or swaging operation.

After the beveling and cleaning operation, the bevel end portions 23 are overlapped and then slightly retracted, as shown in FIG. 8, to expose portions of the bevel at 28b so as to provide triangular voids for receiving displaced or plastic metal from the final planishing or welding process so as to enable mashing of the overlapped end portions to the thickness of the parent sheet or strip as shown in FIG. 10, wherein the weld line 28a is somewhat angular. Such mashing requires considerable pressure by the planishing wheels 16 or perhaps by vibrating hammers (not shown). It should also be understood that in the operation of overlapping the prebeveled strips, the groove or void can initially be provided, for the excess material, by controlling the amount of overlap. This will eliminate the necessity for lap retraction to provide the grooves or voids.

Figure 9:
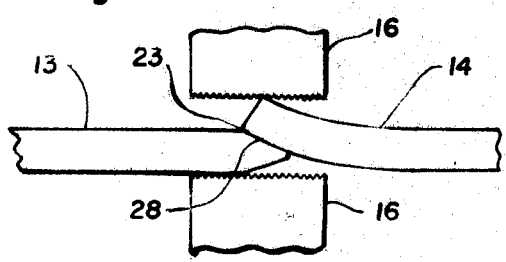
FIG. 9 shows a modification of FIG. 8 wherein only one of the sheets or strips is tapered.

In some situations only one of the strip or sheet end portions is tapered while the other may remain in its initial rectangular form, as shown in FIG. 9.

The preplanishing operation shown in FIG. 8 or 9 may be accomplished either while the tapered end portions 23 are cold or while heated, such as by a torch, so as to make the metal more easily deformable and so as to improve the quality and finish of the welded sheet shown in FIG. 10.

Figure 7:
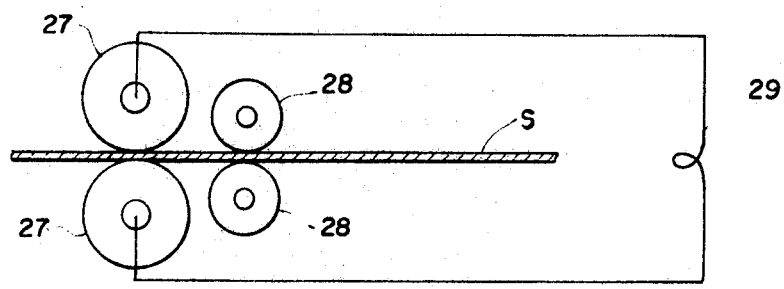
FIG. 7 shows the resistance welding roller electrodes and final planishing rolls.

Of course, when the welding electrode wheels 27 are applied under pressure to the overlapped tapered end portions of the strip 13, 14, as shown in FIG. 7, a resistance welding circuit will be completed through the secondary winding 29 of the welding transformer which will initiate heating at the contacting inner faces of the overlapped, beveled end portions. Following or leading the electrode wheels 27 are planishing rolls, under pressure, which may be either the preplanishing rolls 22, in some instances, or different final planishing rolls 28, as shown. The final planishing rolls 28 are most effective when the overlapped tapered end portions are substantially heated, that is, preheated, such as by the application of a torch, or by the resistance welding process. In many instances it would be desirable to at least partially mash the overlapped tapered electrodes as shown in FIGS. 8 and 9, after they are substantially preheated and to complete the mashing after application of the welding current.

In other instances, preheating may be omitted, that is, the overlapped tapered end portions may be partially mashed while cold and then completely mashed after application of the welding current so as to finally assume the shape shown in FIG. 10.

In some situations, final planishing may be accomplished after the welded joint is allowed to cool. In still other situations, final planishing may be unnecessary because of the excellence of the welded joint.

While a smooth tapered edge portion is shown, it may be roughened, knurled or serrated in some instances by so shaping the beveling surfaces of the preplanishing wheel 22 of FIG. 5, or the preplanishing wheel 20 of FIG. 4 as shown for wheels 16 in FIG. 9.

In still other instances the end portions of the strips or sheets, after tapering, may be bent away from each other before overlapping to provide larger pockets for receiving displaced metal when mashed together by the pre-planishing rolls 16. They may also be grooved for this purpose.

Referring more particularly to FIG. 11 which shows the specific construction of the swaging rolls with vibratory means, numeral 28 denotes a pair of swaging rolls which pivot in pins 32 which are rigidly supported in rams 33 which slide in stationary housings 34. Fastened to or integral with the ram 33 is an elongated plate 35 on which is mounted a vibrator or vibrators 36, various types of which are well known in the art. This or these vibrators will impart a vibratory action to the swaging rolls. In some cases, it is desirable to have the vibrations spread in all random directions. In other cases it is desirable to orient the vibrations in a definite direction. This is done by using multiple vibrators 36 extending radially and spaced circumferentially, as shown, with the vibrating elements running in opposite directions, thus cancelling out certain of the respective vibrations. Vibrators 36 may operate at either subsonic, sonic or ultrasonic frequencies.

To apply the sustained force on the swaging wheels, a fluid cylinder 37 is provided which is mounted stationarily on the machine framework, generally indicated by numeral 38.

On the end of the piston rod of the cylinder is mounted the yoke 39 which straddles the vibrator or vibrators 36. The yoke 39 is indirectly fastened to the elongated plate 35 through the medium of suitable vibration dampeners 40. This is to prevent the vibrations from effecting the operation of fluid cylinder 37.

In addition to the advantages gained by the vibratory force on the joint to be swaged, such vibratory force migrates along the strip lap to the welding wheels 27 which are immediately adjacent to the swaging rolls 28. This vibratory action of the sheets beneath the weld wheels greatly enhances the weld quality of the joint, especially on oxided or coated materials.

The sustained swaging pressure is combined with a vibratory action to do the mechanical work of swaging.

Thus it will be seen that I have provided an efficient apparatus and method for providing a lap weld which will finally assume the same thickness of the parent sheet or strip and which may be accomplished with less bulky machinery and which will provide a welded joint of substantially higher quality than heretofore possible; also, I have provided a resistance welding method which is especially effective for welding silicon steels and the like which are covered by oxide or other coatings, which method eliminates any possibility of entrapment of such oxides or coatings in the welded joint; also, I have provided apparatus and a method of simultaneously beveling the four faces of two end portions of metal strips or sheets before they are overlapped for the preplanishing and welding operations.

The herein described method has the further advantage in that the welding electrodes, particularly if of the wheel type, will be subjected to much less grooving or other cutting action which causes them to deteriorate rapidly. Higher welding pressures may be used to secure adequate ironing out of the joint, or if ordinary pressures are used on the electrodes to be followed by subsequent working of the joint, the electrodes will have much longer life and require less continuing maintenance.

In addition to the above, the method of the invention provides a welded joint which is not only precisely the thickness of the parent stock but is also remarkably free of any waviness or distortion either in the weld zone or in the stock adjacent the same. Furthermore, the surface flatness or finish of the weld zone itself is of much better quality than has heretofore been obtained by more conventional lap welding methods.

While the invention has been described above with special reference to its application to the joining of strip in end-to-end relation, it should be understood that the invention is equally applicable to the welding of sheets, large and small.

I claim:

1. The method of joining metal sheets or strips comprising the step of beveling opposite surfaces of the end portions of the strips to be joined while said end portions are separated, thereafter overlapping the beveled end portions so as to form voids and applying compressive pressure thereto so as to fill the controlled void spaces between said beveled end portions by displaced metal.

2. The method recited in claim 1, wherein said compressive pressure is applied by planishing wheels.

3. The method recited in claim 1, wherein said compressive pressure is applied by means of welding wheels.

4. The method recited in claim 1, wherein said compressive pressure is applied by means of vibratory hammers.

5. The method recited in claim 1, together with the further step of loosening and removing detrimental oxide coatings and the like in the weld area during the beveling operation of said end portions.

6. The method recited in claim 2, wherein said beveled planishing rollers are vibrated while beveling said end portions for accelerating loosening of said coatings.

7. The method recited in claim 6, wherein said loosened coatings are cleaned and removed while beveling said end portions.

8. The method of welding together the end portions of metal sheets or strips, comprising shaping opposite end surfaces of at least one end portion so as to reduce the thickness thereof, overlapping said end portion and the end portion of another sheet so as to provide a metal-receiving void between the end of either sheet and the outer surface of the adjoining sheet, welding while applying planishing roll pressure to opposite surfaces of the overlapped end portions so as to force displaced metal into said void.

9. The method recited in claim 8 wherein said end portion of reduced thickness is knurled.

10. The method recited in claim 8 wherein both said end portions are reduced in thickness by shaping opposite end portions of each sheet, and wherein said voids are provided between the end of each sheet and the reduced surface of the adjoining sheet.

11. The method recited in claim 10 wherein said end portions are roughened and partially overlapped to provide said grooves.

12. The method recited in claim 10 wherein said end portions are knurled.

13. The method recited in claim 10 wherein said sheets are coated with oxide, and wherein said end portions are roughened and cleaned to remove said oxide before welding.

14. The method recited in claim 10 wherein said planishing rolls are knurled so as to roughen the outer surfaces of said reduced, overlapped end portions.

15. The method of welding end portions of coated strips or sheets together comprising shaping and removing the coating from opposite end surfaces of each sheet so as to provide a clean end portion of reduced thickness, overlapping said end portions so as to provide a void between the end of each sheet and the reduced surface of the adjoining sheet, passing welding current through said overlapped sheets and substantially simultaneously applying planishing roll pressure to opposite sides of said overlapped sheets so that displaced weld metal will be deposited in the void.

16. The method recited in claim 15 wherein said shaping of the end surfaces is effected by knurled planishing wheels and wherein said coating removal is effected by a rotating brush.

17. The method recited in claim 16 wherein both said end portions are tapered to a reduced thickness.

18. The method recited in claim 16 wherein vibrations are applied to said partially overlapped end portions during welding.

19. The method recited in claim 18 wherein said vibrations are supersonic.

20. The method of welding together the end portions of oxide coated metal strips comprising applying knurled planishing wheels, under pressure, to opposite surfaces of each of the end portions to be joined sufficiently to roughen and loosen the oxides from said surfaces and to reduce the thickness of the end portion, thereafter removing said oxides, partially overlapping said end portions so as to provide a weld metal-receiving void between the end of each sheet and the cleaned end portion of an adjoining sheet, and passing weld current through and substantially simultaneously applying compressive pressure to said overlapped end portions so that displaced weld metal will be deposited in said voids.

21. The method recited in claim 20 wherein said compressive pressure is applied by a pair of planishing rolls and wherein said oxides are removed by rotating brushes substantially simultaneously with said loosening of the oxides from said end portions.

22. The method recited in claim 21 together with the application of ultrasonic vibrations to said overlapped sheets.

References Cited

UNITED STATES PATENTS

| | | | |
|---|---|---|---|
| 1,935,063 | 11/1933 | Scott | 29—148.2 |
| 3,101,404 | 8/1963 | Hill | 219—128 |
| 2,016,380 | 10/1935 | Lutz | 219—10 |
| 2,362,388 | 11/1944 | MacChesney et al. | 219—4 |
| 3,217,957 | 11/1965 | Jarvie et al. | 228—1 |
| 3,301,994 | 1/1967 | Seeloff | 219—117 |
| 3,313,911 | 4/1967 | Seeloff | 219—117 |

JOHN F. CAMPBELL, Primary Examiner

R. B. LAZARUS, Assistant Examiner

U.S. Cl. X.R.

29—476